July 31, 1962  G. R. ROSE  3,047,167

ELECTRIC CIRCUIT RESET SYSTEM

Filed Sept. 19, 1958  2 Sheets—Sheet 1

INVENTOR.
GLENN R. ROSE
BY
Stuart R. Peterson
ATTORNEY

July 31, 1962 G. R. ROSE 3,047,167
ELECTRIC CIRCUIT RESET SYSTEM
Filed Sept. 19, 1958 2 Sheets-Sheet 2
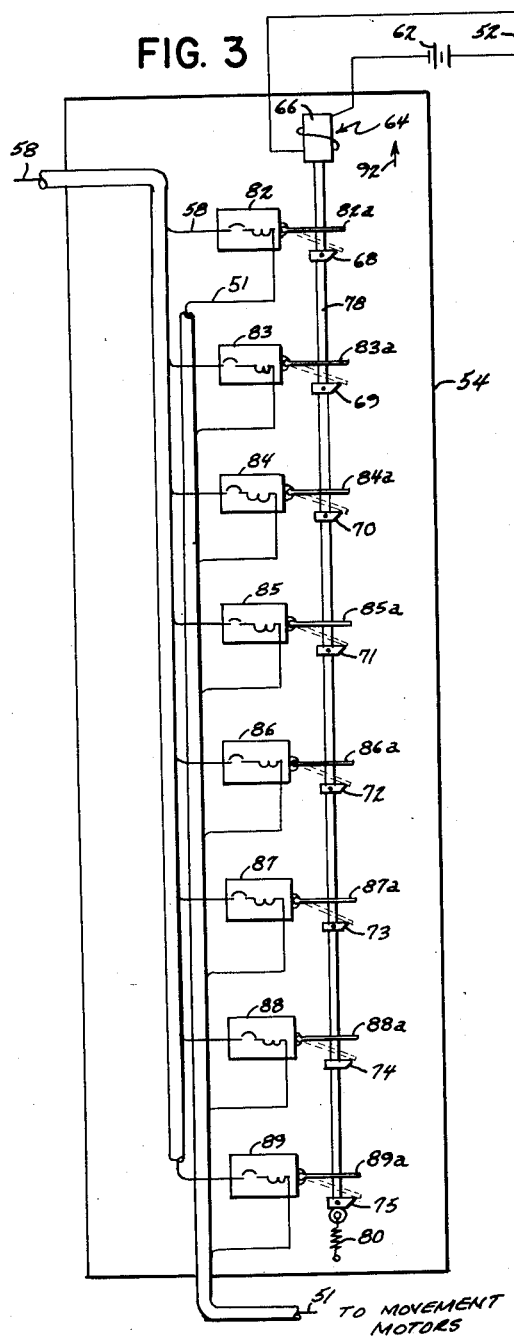
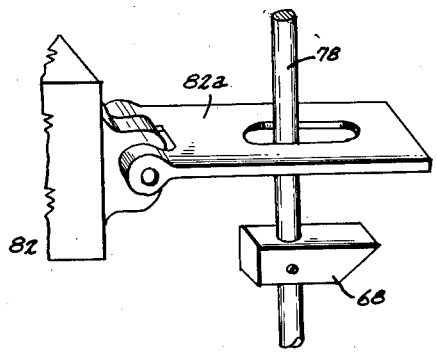
INVENTOR.
GLENN R. ROSE
BY
Stuart R. Peterson
ATTORNEY

United States Patent Office 3,047,167
Patented July 31, 1962

3,047,167
ELECTRIC CIRCUIT RESET SYSTEM
Glenn R. Rose, St. Paul, Minn., assignor to General Mills, Inc., a corporation of Delaware
Filed Sept. 19, 1958, Ser. No. 762,115
9 Claims. (Cl. 214—1)

The present invention relates to improvements in electrical circuit reset systems. More particularly, it pertains to electrical circuit reset systems for resetting circuit breakers in the circuits of the motors which produce the numerous movements in a mounted remotely controlled articulated handling unit which operates in an area that is contaminated to the extent of being detrimental to human life.

In the field of nuclear energy it is often necessary to conduct operations under hazardous or adverse conditions. For example, in many instances personnel and/or equipment must operate in areas exposed to or filled with harmful radiation. On such occasions protection against the harmful and/or deadly effects of said radiation is generally afforded said personnel by suitable shielding.

One method by which protection may be afforded individuals having to perform work in areas exposed to or filled with such radiation is to provide a shielded cab or vehicle for moving said individuals about said areas from which said individuals can visually observe and conduct operations within said areas. Such a cab would have mounted thereon a remotely controlled articulated handling or work unit whose motions resemble certain motions of a human arm and is operable from within said cab to enable the individual to accomplish operations or work tasks which require movements similar to those which can be performed by a human's arm.

A disadvantage of this method of protecting personnel is that shielded cabs and/or vehicles of this type are quite heavy due to the amount of shielding necessary to adequately protect the operator. Therefore, the operator control space or area within the cab must be constructed as small as possible to cut down the weight of the cab while at the same time being large enough to contain the operator and the necessary equipment therein so said operator can regulate the various movements of the remotely controlled articulated handling unit mounted on said cab. That is the operator control space or area will of necessity be extremely small and confined.

Normally the control equipment for regulating the movements of said remotely controlled unit is electrical or electronic in nature and therefore, has a tendency to generate heat. This is especially true of the heavy load current carrying conductors which pass current from the power source to the motors which control the motions of the remotely controlled handling unit.

Since the motion motors are electrical, the heavy load current carrying conductors connecting them to their power source must contain some type of overload safety device, e.g. a fuse or a circuit breaker, to prevent the burning out of said motors. Such an overload safety device should be readily accessible to the operator, so he can replace or reset it. While the desirable situation would be to allow the heavy load current carrying conductors to enter the small confined shielded operator control space of the cab so the overload safety devices of said conductors could be located in said space, the heat generated by said conductors plus the heat emitted by the body of the operator is of such magnitude that out of necessity the conductors should be kept outside of said control space.

Locating the heavy load current carrying conductors outside the shielded operator control space of the cab prohibits ready accessibility to them from said control space. Therefore, conventional overload safety device controls, such as fuses, cannot be used to prevent circuit overload through said conductors. The reason for this is that since the heavy load carrying current conductors into which said fuses would be placed never enter the confined, limited, shielded control space of the cab. Thus no matter where the fuse was placed in the heavy load current carrying conductor circuits, it would be outside the protected shielded control space of the cab. Therefore, in order to replace a fuse an operator would have to leave his protected control space and enter the contaminated work area. This would be extremely hazardous and some method for eliminating this hazard which at the same time enables the keeping of the heavy load current carrying conductors outside the operator control space must be provided in order to keep the weight of the cab down.

Accordingly, one object of this invention is to provide a system for safely resetting circuit breakers which are located in areas exposed to and/or filled with radiation.

Another object of this invention is to provide an electrical reset system which permits positioning the heat generating load current carrying conductors in which circuit breakers are placed remotely from the control which regulates the resetting of said circuit breakers.

A further object of this invention is to provide an electrical reset system in which the control for said system is within a shielded cab and the heavy load current carrying conductors in whose circuits said resetting takes place remain outside said cab.

Another object is to provide an electrical reset circuit for resetting the circuit breakers placed in the heat generating load current conductors for the various motors which control the movements of a remotely controlled articulated handling unit mounted on a shielded cab so said heavy load current conductors do not have to enter the shielded operator space of said cab and where the operator of said cab mounted handling unit can reset said circuit breakers without having to leave said operator space.

Normally, radiation follows straight lines, thus when conductors enter shielded spaces they should be coiled to prevent the passage of radiation there along through the shielding. Coiling of heavy load carrying current conductors creates a design problem. Accordingly, another object of this invention is to provide an electrical reset system for a shielded operating space which eliminates the above design problem created if heavy load current conductors enter the shielded space.

Other objects and advantages of the invention will be apparent from the following description in which a preferred embodiment of the invention is disclosed. In the drawings which form a part of this application, FIGURE 1 is a side view of a known type of remote controlled articulated work or handling unit mounted on a cab;

FIG. 3 is a schematic diagram of the electric circuit reset system which may be used in conjunction with the shielded cab and handling unit shown in FIGS. 1 and 2;

FIG. 4 is a perspective view of the reset lever 82a of the circuit breaker 82 of FIG. 3.

Figure 1:
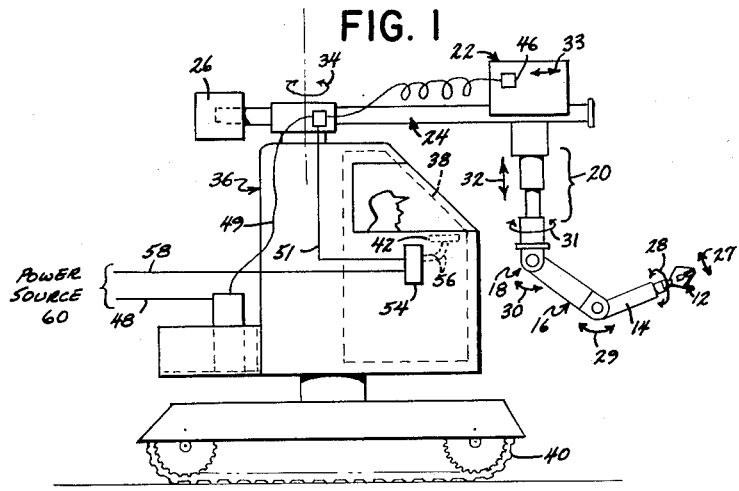

Referring now to the figures, FIG. 1 is a side view of a known type of remote controlled articulated work or handling unit 10. The handling unit 10 comprises a hand member 12, a forearm member 14, an upper arm member 16, and shoulder member 18, an extensible shoulder support member 20, and a shoulder positioning member 22. The shoulder positioning member may be mounted on a pair of tracks 24 which carry a counter balancing weight 26. The members of the handling unit 10 are capable of the motions indicated by arrows 27–34 which may be produced by electric motors. Means for carrying out these motions 27–34 are known in the art as illustrated for example in the co-pending applications of Charles H. Bergsland and Robert S. Hedin, Serial Number 736,285 filed May 19, 1958, for Remote Controlled Handling Unit, now Patent 2,861,701; and of T. R. James, Serial Number 243,705 filed August 25, 1951, for Remote Control Manipulator, now Patent 2,861,700; and of A. H. Youmans, Serial Number 190,387 filed October 16, 1950, for Method and Apparatus for Performing Operations at a Remote Point, now Patent 2,861,699. All of the above applications are assigned to the assignee of the present invention.

The tracks 24 may be mounted on a cab 36 by means known in the art. The cab 36 has a shielded operator control area 38 and may be mounted on a pair of endless tracks 40 so that it may move around in a work area.

Figure 2:
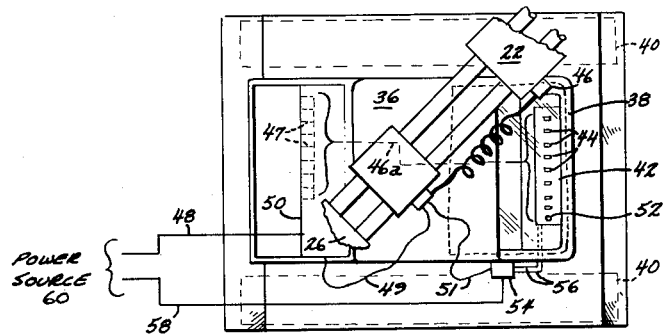
FIG. 2 is a top view of the cab of FIG. 1 showing the control members which regulate the movements of the remote controlled articulated handling unit and the control button for the electric circuit reset system.

The shielded operator control area 38 contains a control panel 42 having control members 44 for regulating the various motions 27–34 of the remotely controlled handling unit 10. Each of the control members 44 has connected thereto a pair of low current carrying conductors, these various pairs of conductors passing through a cable 46a depicted only in dotted form. At the other end of the cable 46c various conductor pairs are connected to the operating coils of an equal number of relays 47 located in a control box 50. Each relay 47 has one of the motion producing motors in circuit therewith. To simplify the drawings, only one such motor has actually been pictured, this motor having been assigned the reference numeral 46. Since eight control members appear in FIG. 2 and since we have selected a total of eight manipulator motions (see the arrows 27–34 in FIG. 1), there will be actually seven more motors that have not been shown. Supplying electric power to the control on relay box 50 is a heavy load current carrying conductor 48. A second heavy load carrying conductor 49 leads from the relay 47 (the one intended to energize the motor 46) to said motor 46. From the motor 46 a third heavy load carrying conductor 51 extends to a reset box 54 that will be referred to in more detail presently. Still another heavy load carrying conductor 58 extends from the reset box 54 to the other side of a power source 60, conductor 48 being connected to the first side of said source 60. Relay sytsems of this type are well known in the art and will therefore not be discussed in further detail.

Also positioned in the control panel 42 is a reset control button 52. This reset button 52 is linked to the electrical circuit reset box 54 through low current carrying wires 56. The reset box 54 has a total of eight pairs of heavy load current carrying conductors like 51 and 58 connected to the individual circuit breakers 82, 83, 84, 85, 86, 87, 88, and 89 contained therein. Said heavy load current carrying conductors like 51 leave said box 54 and are connected to the various motion producing motors referred to in the preceding paragraph.

We thus have a system including a plurality of circuits, each involving heavy load current carrying conductors, such as 48, 49, 51, and 58, which carry current between a power source 60 and the various motion motors, such as said motion motor 46, means for controlling the current in said conductors and hence in said motors, and a remotely controlled reset box in circuit with all of said heavy current carrying conductors to prevent overload currents therein from reaching the various motion motors of which motor 46 is one. All of these circuit components are located outside of the shielded operator control area 38 of the cab 36.

FIGURE 3 shows the details of the electrical circuit reset box 54 and its control button 52. The control button 52 is linked through a battery 62 to a solenoid 64.

The solenoid 64 has a moveable member 66 which is linked to positioning blocks 68, 69, 70, 71, 72, 73, 74, and 75 through a rod 78. A spring 80 is attached to one end of the rod 78 for maintaining said rod in the position shown in FIG. 3. Also contained in the reset circuit box 54 are circuit breakers 82, 83, 84, 85, 86, 87, 88, and 89 which have pivotally attached thereto lever arms 82a, 83a, 84a, 85a, 86a, 87a, 88a, and 89a. When the circuit breaker lever members 82a–89a are positioned as shown in FIG. 3, the circuit breakers 82–89 are closed. That is, current will pass through said circuit breakers. For example current from the power source 60 flows along conductor 58 to the circuit breaker 82. Said current passes through the circuit breaker 82 to continue flowing through conductor 51 to its associated motor 46 which produces one of the handling unit motions, in this instance motion 33. Similarly, current from the power source 60 flows through other heavy load current carrying conductors like 58 to circuit breakers 83–89 and when said circuit breakers are closed said respective currents pass through them to the motors which produce other of the motions 27–34 in the remotely controlled handling unit 10.

When the circuit breaker lever arms 82a–89a are positioned as indicated by the dotted lines of FIG. 3, the circuit breakers 82–89 are open. For example, the current from the power source 60 passing through the conductors 58 and 51 to the motion motor 46 connected thereto is stopped. Similarly, the unshown motors will be stopped when their particular circuit breakers are tripped.

The circuit breaker lever arms 82a–89a are moved from their dotted line positions in FIG. 3 to their solid line positions as follows. The push button 52 is first moved to complete the circuit between the battery 62 and the solenoid 64. This energizes the solenoid 64 which causes movable member 66 to move in the direction indicated by arrow 92. Any of the lever arms 82a–89a which is in its dotted position, i.e. its tripped position, is engaged by its respective positioning block 68, 69, 70, 71, 72, 73, 74, or 75 which moves any such lever arm back to its solid line position. Releasing the button 52 breaks the circuit between the solenoid 64 and the battery 62, thereby permitting spring 80 to return the rod 78 to its normal position. With the rod 78 in its normal position the circuit breaker levers 82a–89a can, when their respective circuit breakers are subjected to too much current, move to their dotted line positions and open their respective circuits.

I have thus shown a system whereby the heavy load current carrying conductors like 58, 51, 49, and 48 which must for reasons of necessity remain outside of the shielded control space of a cab which operates in a contaminated work area, can have the overload safety devices in circuit with said conductors reset by the operator positioned in said shielded cab control area without said operator having to leave said shielded control area and without the disadvantage of having said heat generating heavy load current carrying conductors running into said cab.

I claim as my invention:

1. An electrically operated material handling system comprising a cab having a shielded operating space, a remotely controlled articulated handling unit mounted on said cab, said handling unit being capable of various motions, motors situated outside said space and linked to said handling unit for producing said motions, heavy load current carrying conductors positioned outside of said space and in circuit with said motors, circuit breakers in series with said conductors and located outside of said space, movable arms on said circuit breakers, said arms being movable to—first positions when said breakers are closed and to—second positions when said breakers are tripped, means for actuating said movable arms into their first positions, control means located within said shielded operating space for effecting operation of said actuating means, and control means for producing said various motions of said unit.

2. An electrically operated material handling system comprising a cab having a shielded operating space, a remotely controlled articulated handling unit mounted on said cab, said handling unit being capable of various motions, motors mounted outside of said space and electrically associated with said handling unit for producing said motions, heavy load current carrying conductors positioned outside of said space and in circuit with said motors, circuit breakers in series with said conductors and located outside of said space, movable arms on said circuit breakers, said arms being movable to first positions when said breakers are closed and to second positions when said breakers are tripped, means for actuating said movable arms into their first positions, means for affecting the activation of said actuating means, control means located within said shielded operating space electrically connected to said last mentioned means, and means located within said shielded operating space, for controlling said various movements of said handling unit.

3. An electrically operated material handling system comprising a cab having a shielded operating space, a remotely controlled articulated handling unit mounted on said cab, said handling unit being capable of various motions, motors mounted outside of said space and electrically associated with said handling unit for producing said motions, heavy load current carrying conductors positioned outside of said space and in circuit with said motors, circuit breakers in series with said conductors and located outside of said space, movable arms on said circuit breakers, said arms being movable to first positions when said breakers are closed and to second positions when said breakers are tripped, rod means for actuating said movable arms into their first positions, spring means biasing said rod means in a direction to permit said arms to move into their second positions, a solenoid associated with said rod means for overcoming the action of said spring means, control means located within said shielded operating space, low current carrying conductors electrically connecting said solenoid and said control means, and means located within said shielded operating space for controlling said various movements of said handling unit.

4. An electrically operated material handling system comprising a cab having a shielded operating space, a remotely controlled articulated handling unit mounted on said cab, said handling unit being capable of various motions, motors mounted outside of said space and electrically associated with said handling unit for producing said motions, heavy load current carrying conductors positioned entirely outside of said space and in circuit with said motors, circuit breakers in series with said conductors and located outside of said space, movable arms on said circuit breakers, said arms being movable to first positions when said breakers are closed and to second positions when said breakers are tripped, a rod for actuating said movable arms into their first positions, spring means biasing said rod in a direction to permit said arms to move into their second positions, a solenoid associated with said rod for overcoming the action of said spring means, control means located within said shielded operating space, low current carrying conductors electrically connecting said solenoid and said control means, relay means located outside of said space and having one section thereof in circuit with said heavy load carrying conductors, control members positioned within said space, and low current carrying conductors electrically connecting another section of said relay means to said control members.

5. An electrically operated material handling system comprising a shielded operating space, a work handling unit capable of various motions, motors mounted outside of said space and electrically associated with said handling unit for producing said motions, heavy load current carrying conductors positioned outside of said space and in circuit with said motors, circuit breakers in series with said conductors and located outside of said space, movable arms on said circuit breakers, said arms being movable to first positions when said breakers are closed and to second positions when said breakers are tripped, means for actuating said movable arms into their first positions, means for affecting the activation of said actuating means, control means located within said shielded operating space electrically connected to said last mentioned means, and means located within said shielded operating space for controlling said various movements of said handling unit.

6. An electric circuit reset system for resetting circuit breakers placed in conductors comprising a circuit breaker in series with each of said conductors, moveable means on said circuit breakers, said moveable means being moveable to first positions when said breakers are closed and to second positions when said breakers are tripped, rod means for actuating said moveable means into their closed positions, a first means for moving said rod means in a direction to permit said moveable means to move independently of the movement of said rod means into their tripped positions, a second means associated with said rod means for moving said rod means in order to overcome the action of said first rod moving means, and control means electrically connected to at least one of said rod moving means for energizing said one rod moving means.

7. An electric circuit reset system for resetting circuit breakers placed in conductors comprising a circuit breaker in series with each of said conductors, moveable means on said circuit breakers, said moveable means being moveable to first positions when said breakers are closed and to second positions when said breakers are tripped, rod means for actuating said moveable means into their closed positions, a biasing means for moving said rod means in a direction to permit said moveable means to individually move independently of the movement of said rod means into their tripped positions, a solenoid associated with said rod means for overcoming the action of said biasing means, and control means electrically connected to said solenoid for energizing said solenoid to cause said rod means to move so as to close any of said circuit breakers which are tripped when said solenoid is energized.

8. An electrically operated material handling system comprising an operating space, a work handling unit capable of various motions, motors electrically associated with said handling unit for producing said motions, heavy load current carrying conductors positioned in circuit with said motors, circuit breakers in series with said conductors, moveable means associated with said circuit breakers, said moveable means being movable to first positions when said breakers are closed and to second positions when said breakers are tripped, means for actuating said moveable means into their first positions, control means located within said operating space for effecting operation of said actuating means, and means located within said operating space for controlling said various movements of said handling unit.

9. An electrically operated material handling system as set forth in claim 8 in which said means for actuating said moveable means includes a reciprocatable rod with means for engaging said moveable means.

References Cited in the file of this patent

UNITED STATES PATENTS

| | | |
|---|---|---|
| 2,669,622 | Owens | Feb. 16, 1954 |
| 2,746,612 | Wirz | May 22, 1956 |
| 2,748,209 | Florschutz | May 29, 1956 |
| 2,822,094 | Greer | Feb. 4, 1958 |
| 2,878,946 | Wirkkala | Mar. 24, 1959 |